Patented Jan. 28, 1947

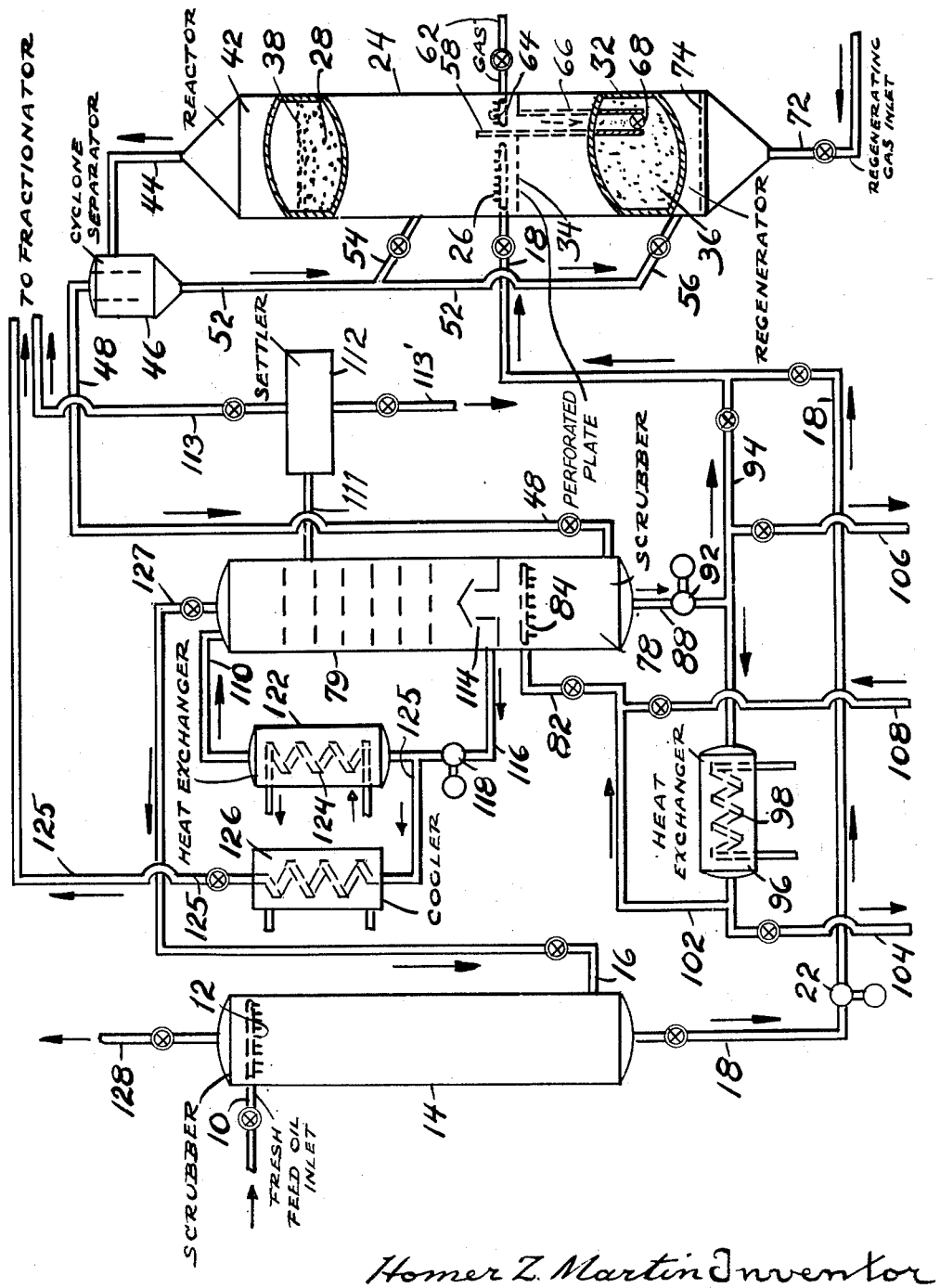

2,414,883

UNITED STATES PATENT OFFICE 2,414,883

CATALYTIC REACTIONS

Homer Z. Martin, Cranford, N. J., assignor to Standard Oil Development Company, a corporation of Delaware Application October 14, 1942, Serial No. 461,915

7 Claims. (Cl. 196—52)

This invention relates to catalytic reactions using finely divided catalyst and more particularly relates to the catalytic conversion of hydrocarbons using powdered catalyst.

In previous processes for the conversion of hydrocarbons where it is necessary to regenerate catalyst, the reaction zone and regeneration zone are maintained separate and each has its own separating system for separating powdered catalyst from vapor or gas.

According to my invention the reaction zone and regeneration zone are so arranged that the reaction product vapors and regeneration gases are mixed and passed to a single separating system to separate a major proportion of the powdered catalyst from the vapors and gases. The vapors and gases are then scrubbed to remove entrained catalyst particles and then cooled to condense liquid products which are fractionated to separate desired products. The uncondensed gases are preferably scrubbed with fresh feed to recover valuable light hydrocarbons from the uncondensed gases.

Preferably the reaction zone and regeneration zone are arranged in a single vessel with the reaction zone above the regeneration zone, the two zones being separated by a perforated member. Fouled or spent catalyst is removed from the bottom of the reaction zone and introduced into the regeneration zone where it is mixed with a suitable regenerating gas to burn off carbonaceous material from the catalyst. The regenerated catalyst and hot regeneration gases pass upwardly through the perforated member into the reaction zone where the desired catalytic reaction is being carried out. Vaporous reaction products and regeneration gases leave the top of the reaction zone and this mixture is treated to separate entrained catalyst from vapors and gases and the vapors and gases are further treated to separate desired products.

In the drawing the figure represents one form of apparatus which may be used to carry out my invention.

Referring now to the drawing, the reference character 10 designates a line for conducting fresh feed oil or other liquid charging stock through spray nozzles 12 arranged in the upper portion of a scrubbing tower 14. Uncondensed vapors and gases separated from the reaction products are introduced into the bottom portion of the scrubbing tower 14 through line 16. As the gases and vapors pass upwardly through the scrubbing tower 14, the scrubbing oil removes desirable light hydrocarbons from the uncondensed vapors and gases. Tower 14 may be either a plate or a packed tower so that countercurrent operation is obtained.

Where a relatively heavy hydrocarbon oil such as gas oil, crude petroleum oil or reduced crude petroleum oil is used as the charging stock, this oil is introduced into the scrubbing tower as the scrubbing medium. The vapors and gases introduced through line 16 separated from catalytically cracked products contain $C_3$, $C_4$ and $C_5$ hydrocarbons and it is desired to recover these hydrocarbons from the gases and vapors, at least in part.

The enriched feed oil is withdrawn from the bottom of the scrubbing tower 14 and passes through line 18 by pump 22 and is introduced into the bottom portion of a reaction zone 24. Preferably the feed in a hydrocarbon conversion operation is introduced into the reaction zone as a liquid where it is vaporized and maintained at reaction temperature by contact with hot regenerated powdered catalyst. In this way it is not necessary to have a vaporizing furnace for vaporizing the feed stock and furthermore stocks which cannot be completely vaporized may be used in my invention. The liquid feed is introduced into the bottom portion of the reaction zone by means of a plurality of upwardly directed nozzles 26 for distributing the liquid feed throughout the mass of powdered catalyst 28.

The liquid feed is preferably preheated by heat exchange with fractionator side streams or bottoms withdrawn from another scrubbing tower later to be described. After the preheating some of the oil may be vaporized but insufficient heat is added to completely vaporize the feed stock. The hydrocarbon vapors are maintained in the reaction zone 24 in contact with the powdered catalyst for a sufficient time to effect the desired extent of conversion. The reaction zone 24 in the form of the invention shown in the drawing is formed as part of a single vessel and the reaction zone forms the upper part of the vessel. The lower part of the vessel forms a regeneration zone 32 which is separated from the reaction zone by a perforated distribution plate 34. During regeneration hot regeneration gases are formed and these gases together with regenerated catalyst pass from the regeneration zone 32 through the distribution plate 34 into the reaction zone 24 thereby supplying heat to the reaction zone.

The velocity of the vapors and gases passing through the catalyst 28 in reaction zone 24 is so maintained to form a fluidized mixture of catalyst particles. The fluidized catalyst particles as a mass assume some of the characteristics of a liquid and the fluidized mixture has a level indicated at 38. The vaporous reaction products and regeneration gases leave the body of the fluidized catalyst and pass to a disengaging space 42 above the level 38 in the reaction zone 24. In commercial operation the disengaging height 42 is preferably 10 to 15 feet and the velocity of gases and vapors passing through the disengaging space or height 42 is maintained at about 1.5 feet per second to maintain the amount of catalyst carry-over at a minimum. Under these conditions the amount of catalyst carried over is about .003 lb./cu. ft. of vapors and gases.

The reaction product vapors and regeneration gases pass overhead through line 44 and in order to separate some of the entrained catalyst particles the vapors and gases are introduced into a separating means 46 which is shown in the drawing as a cyclone separator but other separating means may be used and/or one or more cyclone separators may be used. The cyclone separator may be installed in the upper part of the reaction vessel so as to make a more compact structure and minimize the amount of external steel plate required. The separated vapors and gases containing a small amount of entrained catalyst pass overhead through line 48 and are further treated as will be presently described for removing all of the entrained catalyst.

The separated catalyst particles are withdrawn from the bottom of the separating means 46 and introduced into a standpipe 52 for returning the separated catalyst either to the reaction zone or to the regeneration zone. A line 54 is provided for returning the catalyst particles to the reaction zone 24 and another line 56 is provided for returning the separated catalyst particles to the regeneration zone 32. If desired, the standpipe 52 may be provided with spaced inlet lines for introducing fluidizing gas into the catalyst in the standpipe to maintain the catalyst particles in fluidized condition.

Where the apparatus is used for catalytic cracking of gas oil or crude petroleum oil, the temperature during cracking to produce motor fuel is about 850° F. to 1000° F. If a lighter stock is used as feed to produce aviation gasoline, lower cracking temperatures of about 750° F. to 850° F. are used. The powdered catalyst may be any suitable cracking catalyst such as acid treated bentonite clays or synthetically prepared silica alumina or silica magnesia catalyst. Other suitable cracking catalysts may be used. The powdered catalyst has a size of about 200 to 400 standard mesh or finer with less than about 25% by weight of particles having a size of 0 to 20 microns. In cracking relatively heavy hydrocarbon stocks to produce gasoline or motor fuel the ratio of catalyst to liquid oil by weight may vary between about 2 parts of catalyst to 10 parts of catalyst to one of oil. In some cases it may be necessary to add finely divided inert material to the catalyst to provide a sufficient amount of solid particles to supply sufficient heat to the liquid oil being injected into the reaction zone without causing overcracking.

In cracking hydrocarbon oils and in other catalytic reactions where a burnable deposit is accumulated on the catalyst particles the catalyst particles may be regenerated by removing the combustible deposit. As the catalyst particles become contaminated or spent they are withdrawn from the bottom of the reaction zone 24 as a fluidized mass. Preferably the lower portion of the reaction zone 24 is provided with a vertically extending baffle 58 which extends entirely across the reaction vessel or zone and extends above the distribution plate 34 for a short distance to separate the portion of the reaction zone where the oil is injected from that portion of the reaction zone from which the contaminated catalyst particles are being withdrawn. Before withdrawing the contaminated catalyst particles, gas, such as steam or other inert gas is introduced through line 62 having upwardly extending nozzles 64 within the bottom portion of the reaction zone 24 to supply a purging gas to remove volatile constituents from the spent catalyst particles.

The purged spent catalyst particles are then introduced into a standpipe 66 which is arranged inside of the regeneration zone 32 and which delivers spent catalyst from the reaction zone to the regeneration zone 32. The lower portion of the standpipe 66 has a control valve 68 which may be operated to control the amount of spent catalyst being introduced into the regeneration zone 32.

Regenerating gas such as air or other oxygen-containing gas is passed through line 72 and introduced into the bottom portion of the vessel forming the regeneration zone and the regenerating gas is passed upwardly through a distribution plate 74 forming the floor of the regeneration zone 32. The distribution plate 74 functions to evenly distribute the regenerating gas into the catalyst 36 being regenerated in the regeneration zone 32. This grid can be made up of brick work or of a steel grid supported on brick work.

The velocity of the regenerating gas passing through the regeneration zone is maintained at such a figure to keep the catalyst particles in fluidized condition during regeneration. Under these conditions the catalyst particles are maintained in a turbulent condition and intimate contact between the catalyst particles and regenerating gas is obtained.

As above pointed out, the hot regeneration gases and the hot regenerated catalyst pass upwardly through the distribution plate 34 into the bottom portion of the reaction zone 24. During regeneration the temperature is maintained between about 1000° F. and 1200° F. These temperatures are higher than the temperature in the reaction zone and it will be seen that heat is supplied to the reaction zone by the regeneration gases and the hot regenerated catalyst particles. If for any reason insufficient heat is generated in the regeneration zone, fuel, such as oil or gas, may be burned in the regeneration zone; or the fuel may be burned outside the regeneration zone and the hot combustion gases introduced into the regeneration zone.

The amount of air introduced into the regeneration zone 32 is further controlled so that the amount of oxygen remaining in the regeneration gases leaving the regeneration zone 32 is relatively low, preferably about 0.5%, but percentages up to about 1% may be tolerated. The free oxygen in the regeneration gases may cause loss of hydrocarbons due to oxidation when the regeneration gases are introduced into the reaction zone 24. However, any loss due to this oxidation is relatively small. In addition, the burning of a small amount of hydrocarbons will raise the temperature of the reaction zone but excessive temperatures will be avoided because of the large amount of catalyst particles accompanying the regeneration gases.

To maintain the amount of oxygen in the regeneration gases passing through the reaction at a minimum, combustible material such as gaseous hydrocarbons may be introduced into the upper part of the regenerator zone 32.

Returning now to the vaporous reaction products separated in the separating means 46, the vaporous reaction products and regeneration gases are passed through line 48 and introduced into the lower portion of a second scrubbing zone 78 forming the lower portion of a direct contact condenser 79. Scrubbing zone 78 may be provided with contacting means such as disc and doughnut plates. The vapors still contain entrained catalyst particles and these particles are separated in the scrubbing zone 78 by introducing a scrubbing oil through line 82 provided with spray nozzles 84 in the upper portion of the scrubbing zone 78. The vapors and gases are passed upwardly and are scrubbed by the downwardly passing scrubbing oil. During scrubbing some of the heavier constituents are condensed and the catalyst particles are removed from the vapors and gases.

The scrubbing oil and any condensed material is withdrawn from the bottom of the scrubbing zone 78 as a slurry containing catalyst. The slurry is passed through line 88 by means of pump 92 and a portion or all of the slurry may be passed through line 94 and mixed with the charge oil passing through line 18 for introduction into the reaction zone 24. Another portion of the slurry may be passed through heat exchange apparatus 96 having a heat exchange coil 98 for cooling the slurry and returning it through line 102 to line 82 as cooled scrubbing oil for the scrubbing zone 78. Cooler 96 may be a steam generator or it may be used to preheat the feed to the cracking chamber, etc. A portion of the cooled scrubbing oil may be withdrawn from the system through line 104.

A portion or all of the scrubbing oil or slurry withdrawn from the bottom of the scrubbing zone 78 may be passed through line 106 to a fractionating tower or other equipment and the cooled scrubbing oil then returned through line 108 to scrubbing oil inlet 82 for the scrubbing zone 78.

The scrubbed vapors and gases leave the upper portion of the scrubbing zone 78 and are passed into the direct contact condenser 79 where they rise countercurrent to relatively cool liquid introduced into the top of the condenser 79 through line 110. The direct contact condenser may be either a plate or a packed tower. In the condenser 79 the vapors and gases are cooled to a relatively low temperature to condense substantially all of the normally liquid hydrocarbons and water. The water and part of the lighter condensed hydrocarbons are removed from the upper portion of the condenser 79 as a side stream through line 111 and passed to a settling zone 112 for separating water from the liquid hydrocarbons, the latter being sent to an appropriate tray in a fractionating tower through line 113. Water is withdrawn from settling zone 112 through line 113'. A trap-out tray 114 arranged above the scrubbing zone 78 is used for cooling heavier liquid hydrocarbons. This condensed liquid is withdrawn from trap-out tray 114 through line 116 by pump 118 and at least a part thereof passed through a heat exchanger 122 having a coil 124 for the heat exchange medium. The cooled liquid is returned to the top of the direct contact condenser 79 through line 110 as above described. A part of the condensed liquid in line 116 may be passed ahead of cooler 122 through line 125, having a cooler 126 if desired, and then to the fractionating system to segregate desired fractions from the cracked products.

An alternate method of design is to enlarge the direct contact cooler 79 and add thereto a number of side stream strippers so that the fractionation may be carried out in the same equipment which is used for removing the heat in the overhead products of cracking.

The uncondensed regeneration gases leave the upper portion of the direct contact condenser 79 through line 127 and are introduced into the lower portion of the first scrubbing zone 14 through line 16 in order to recover valuable gaseous hydrocarbons such as $C_4$ and $C_5$ hydrocarbons from the gases. The gas leaving the top of the first scrubbing zone 14 through line 128 contains gaseous hydrocarbons and has a heating value of about 300 B. t. u. per cubic foot and these gases may be used as fuel around the refinery or may be sold as fuel gas.

Instead of passing the fresh feed containing the absorbed light hydrocarbons into the cracking chamber immediately after being preheated to a greater or lesser degree, it is possible to strip the light hydrocarbons from the feed, passing these vaporized light products directly to the $C_4$ recovery equipment which would be associated with a plant of this type. This prevents the recycling of the lighter hydrocarbons through the cracking system, simplifies the operation generally, and cuts down the volume of gases which must be handled in the various pieces of equipment.

One feature of my invention is the simple construction of the catalytic section. The reaction zone and regeneration zone are arranged in a single vessel and only one set of catalyst recovery equipment is necessary. No recovery equipment is required for the regeneration zone and the catalyst recovery equipment required for the reaction zone is no more than in other methods of catalytic conversion of hydrocarbons.

Another important feature of my invention is that the total pressure on the system is so selected that the partial pressure of the hydrocarbon vapors leaving the reaction zone is equal to about 10 lbs./sq. in. gauge for example. This means that the total volume of gases at operating conditions leaving the reactor or reaction zone is the same as that which would be obtained if the catalytic reaction took place at 10 lbs./sq. in. gauge without the presence of extraneous flue gases or regeneration gases. Catalyst recovery and butane recovery are both greatly simplified by designing in this manner.

In the drawing the reaction zone and regeneration zone are shown as having the same diameter and while this construction may be used it may be found desirable to increase the diameter of the reaction zone arranged above the regeneration zone in order to decrease the velocity of the gases and vapors in the reaction zone.

A specific example of catalytic cracking of gas oil will now be given but it is to be understood that my invention may be used with other reactants to carry out catalytic reactions in the presence of powdered catalyst. A gas oil having an initial boiling point of about 400° F. to 500° F. and a mid boiling point of about 600° F. to 750° F. and having an A. P. I. gravity of about 25° to 35° is used as the feed stock passing through line 10. In the first scrubber 14 the gas oil scrubs uncondensed gases leaving the top of the condenser 79 to remove volatile hydrocarbons such as butanes from the gases. The temperature in the scrubber 14 is about 100° F. The partly preheated gas oil is then further heated by indirect heat exchange with bottoms from the second scrubbing zone 78 or with side streams or bottoms from the fractionator (not shown) for segregating the desired products.

The gas oil at a temperature of about 400° F. is introduced into the bottom of the reactor 24 where it contacts powdered cracking catalyst. The catalyst is an acid treated bentonite clay having a size of about 200 to 400 standard mesh or finer. About 4 to 10 parts of catalyst to one part of oil by weight is used. The catalyst is at a high temperature and is in a sufficient amount to vaporize the gas oil and raise it to a cracking temperature of about 925° F. The oil vapors remain in the reaction zone for about 30 seconds.

The catalyst particles during the cracking become coated with carbonaceous material and the catalyst is withdrawn as a dense phase through standpipe 66 into the regeneration zone 32 wherein it is mixed with regenerating gas such as air. The regeneration is carried out at a temperature of about 1100° F. The hot regeneration gases and regenerated catalyst pass upward through distribution plate 34 into the reaction zone. The hot regeneration gases and vaporous reaction products pass upwardly through the reaction zone and the mixture is taken off at the top of the reaction zone through line 44.

The temperature of the mixed regeneration gases and reaction vapors is about 900° F. This mixture is introduced into the scrubber 78 where its temperature is reduced to about 600° F. to 650° F. and the entrained catalyst is scrubbed from the gases and vapors and heavy ends of the mixture are condensed. The heat absorbed by the liquid in the scrubber 78 is removed by the heat exchanger 96 which may be used to make steam, heat water or preheat the feed after it has passed through the first scrubbing zone 14.

The uncondensed vapors pass upwardly to the direct contact condenser 79 where they are cooled to about 100° F. so that substantially all of the hydrocarbons are condensed and water is also condensed. Part of the butanes are condensed and pass with the liquid withdrawn from trap-out tray 114 or from separator 112 to the fractionator or fractionating system (not shown).

The uncondensed gases containing some butanes and higher are passed at about 100° F. into the first scrubbing zone 14 where an additional amount of butanes and C5 hydrocarbons are recovered from the gas.

In the above example, about 40% of the gas oil is converted to gasoline having an octane number of about 78 to 80 C. F. R. M. M.

While one form of apparatus has been shown and one example given of catalytic cracking of hydrocarbons to make motor fuel, it is to be understood that these are by way of example only and my invention may be used for other catalytic reactions such as dehydrogenation, polymerization, reforming, etc., without departing from the spirit of my invention.

I claim:

1. An apparatus of the character described including a vessel having a reaction section adapted to receive fresh catalyst and a regeneration section, a horizontally arranged perforated plate separating said sections, tubular means for conducting catalyst from the bottom portion of said reacting section to said regeneration section, means for introducing hydrocarbons to said reaction section and an outlet for reaction products from said reaction section, a second horizontally extending perforated plate forming the bottom of said regeneration section, means for introducing a regenerating gas below said second plate and into said regeneration section, said reaction section being above said regeneration section whereby regenerated catalyst and regeneration gases pass from said regeneration section through said first perforated plate into said reaction section.

2. A process for catalytic conversion of hydrocarbons which comprises mixing hydrocarbons with powdered catalyst in a reaction zone, maintaining the catalyst in a relatively dense fluidized condition therein, introducing a purging gas within the bottom portion of the reaction zone, withdrawing a confined stream of purged, spent catalyst from the bottom portion of the fluidized catalyst and passing it in a relatively dense condition directly to a regeneration zone disposed directly below and merging with said reaction zone, uniformly distributing and mixing regenerating gas with the spent catalyst in the regeneration zone to maintain the spent catalyst in a fluidized turbulent condition and to regenerate the catalyst, passing the regenerated catalyst and regeneration gases while out of contact with said confined stream of spent catalyst upwardly and distributing a mixture of the regenerated catalyst and regeneration gases uniformly and in direct contact with the body of fluidized catalyst in said reaction zone, and removing a mixture of vaporous reaction products and regeneration gases substantially free from entrained catalyst from the top of said reaction zone.

3. A process for catalytic conversion of hydrocarbons which comprises mixing hydrocarbons with powdered catalyst in a reaction zone, maintaining the catalyst in a relatively dense fluidized condition therein, introducing a purging gas within the bottom portion of the reaction zone, withdrawing a confined stream of purged, spent catalyst from the bottom portion of the fluidized catalyst and passing it in a relatively dense condition directly to a regeneration zone disposed directly below and merging with said reaction zone, uniformly distributing and mixing regenerating gas with the spent catalyst in the regeneration zone to maintain the spent catalyst in a fluidized turbulent condition and to regenerate the catalyst, passing the regenerated catalyst and regeneration gases while out of contact with said confined stream of spent catalyst upwardly and distributing a mixture of the regenerated catalyst and regeneration gases uniformly and in direct contact with the body of fluidized catalyst in said reaction zone, and removing a mixture of vaporous reaction products and regeneration gases from the top of said reaction zone.

4. A process according to claim 2 wherein the vaporous reaction products and regeneration gases are cooled to a temperature sufficiently low to condense substantially all the normally liquid hydrocarbons and then separating the condensed hydrocarbons into desired fractions.

5. A process according to claim 2 wherein the vaporous reaction products and regeneration gases are cooled to condense substantially all the normally liquid hydrocarbons and the uncondensed gases are scrubbed with charge oil to recover valuable hydrocarbons including C4 hydrocarbons and passing the enriched charge oil to said reaction zone.

6. A process according to claim 3 wherein the vaporous reaction products and regeneration gases removed from the top of said reaction zone contain entrained catalyst particles and at least part of the entrained catalyst particles is recovered and passed to said regeneration zone.

7. Apparatus according to claim 1, wherein a vertical baffle extends a short distance above said first perforated plate, rising therefrom adjacent said tubular means and extending entirely across the reaction section, to prevent catalyst in said reaction section from passing through said tubular means into said regeneration section before the catalyst becomes contaminated.

HOMER Z. MARTIN.